(12) United States Patent
Moxon

(10) Patent No.: US 10,960,984 B2
(45) Date of Patent: Mar. 30, 2021

(54) DISTRIBUTED ENERGY STORAGE SYSTEM

(71) Applicant: ROLLS-ROYCE plc, London (GB)

(72) Inventor: Matthew Moxon, Derby (GB)

(73) Assignee: Rolls-Royce plc

(*) Notice: Subject to any disclaimer, the term of this patent is extended or adjusted under 35 U.S.C. 154(b) by 35 days.

(21) Appl. No.: 16/458,321

(22) Filed: Jul. 1, 2019

(65) Prior Publication Data

US 2020/0023983 A1  Jan. 23, 2020

(30) Foreign Application Priority Data

Jul. 23, 2018 (GB) .................................... 1811982

(51) Int. Cl.
*B64D 27/24* (2006.01)

(52) U.S. Cl.
CPC .......... *B64D 27/24* (2013.01); *B64D 2221/00* (2013.01)

(58) Field of Classification Search
CPC ............................ B64D 27/24; B64D 2221/00
USPC ......................................................... 307/9.1
See application file for complete search history.

(56) References Cited

U.S. PATENT DOCUMENTS

| 9,764,829 | B1 | 9/2017 | Beckman et al. |
| 9,908,619 | B1 | 3/2018 | Beckman et al. |
| 2014/0179535 | A1 | 6/2014 | Stuckl et al. |
| 2019/0002114 | A1* | 1/2019 | Ferran ................... B64D 27/24 |

FOREIGN PATENT DOCUMENTS

| CN | 106828886 | 6/2017 |
| WO | 2011023396 | 3/2011 |
| WO | 2016144421 | 9/2016 |

OTHER PUBLICATIONS

Great Britain Search Report dated Jan. 17, 2019, issued in GB Patent Application No. 1811982.6.
GB Search Report dated Nov. 27, 2019, issued in GB Patent Application No. 1908819.4.

* cited by examiner

*Primary Examiner* — Hal Kaplan
(74) *Attorney, Agent, or Firm* — Barnes & Thornburg LLP

(57) ABSTRACT

A modular energy storage system within a vehicle, wherein the energy storage system comprises a plurality of discrete energy storage units which are movable within the vehicle and selectively securable in a variety of positions.

18 Claims, 3 Drawing Sheets

DISTRIBUTED ENERGY STORAGE SYSTEM

CROSS-REFERENCE TO RELATED APPLICATIONS

This application is based upon and claims the benefit of priority from British Patent Application No. GB 1811982.6, filed on 23 Jul. 2018, the entire contents of which are incorporated by reference.

BACKGROUND

Technical Field

The present disclosure relates to a distributed energy storage system. More particularly, the present disclosure relates to a distributed energy storage system in an aircraft.

Description of the Related Art

Conventional aircraft consist of a fuselage, to be filled with payload, supported by a wing. Most fuselage designs are substantially in the form of a tube and generate only a small amount of lift. The majority of lift is produced by the wing, with the result that an aircraft's centre of lift or centre of pressure will typically be located at a longitudinal position, usually approximated at 25%, along the mean aerodynamic chord of the wing aerofoil.

For reasons of stability, an aircraft's centre of gravity (CG) should normally be located slightly ahead/in front of its centre of lift. A horizontal stabilizer at the tail of the aircraft can then be arranged to provide a relatively small quantity of negative lift to balance the aircraft in level flight. It may be seen that the quantity of negative lift required from the horizontal stabilizer for a given mass is a function of the length of the moment arms between the both the centre of mass of the aircraft and the horizontal stabilizer and the aircraft's centre of lift.

The addition of mass to an aircraft will generally tend to move the centre of gravity rearwards along the fuselage. To ensure that the CG remains ahead of the centre of lift once loaded, aircraft intended to carry larger payloads have been designed with their wing located further rearwards, towards the tail, than would otherwise be the case. One result of this is that the length of the moment arm available to the horizontal stabilizer is reduced, and the area of stabilizer must therefore be increased to provide the same counteracting effect, increasing drag and reducing the efficiency of the aircraft during flight.

One key aircraft design parameter is the horizontal tail volume coefficient, $V_h$, which is defined as follows:

In the numerator, $S_h$ is the horizontal tail area and $I_h$ is the horizontal tail moment arm. In the denominator, S is the wing area and c is the average wing chord. $V_h$ is therefore a ratio of horizontal tail geometries to wing geometries, and serves as a significant parameter both in the longitudinal stability and longitudinal trim issues.

There is a relatively small range of tail volume coefficients that provide suitable stability and handling characteristics for aircraft. An aircraft with a small $V_h$ will be highly responsive but relatively unstable, whereas a higher $V_h$ will provide an aircraft which has good longitudinally stability but is less responsive. It should be clear that there is a compromise between stability and manoeuvrability.

In many cases, it is economically advantageous for the aircraft to have a wide centre of gravity range, in order that it may transport a wide variety of payloads according to market demands. An aircraft's pitch behaviour will be very sensitive to the CG location if the $V_h$ is too low, so most jet transport aircraft tend to have a relatively high tail volume coefficient, despite the associated loss of responsiveness. As previously discussed, aircraft intended to carry larger payloads will also typically have their wings located further towards the tail, which reduces the available horizontal tail moment arm $I_h$. In order to maintain a high $V_h$ the horizontal tail area $S_h$ of these aircraft must be further increased, causing greater drag and reducing their efficiency still further. Indeed, even small tail volume coefficients $V_h$ can require physically large tails if the moment arm $I_h$ is short.

It should be clear that it would be preferable, both for reasons of efficiency and manoeuvrability, if the tail volume coefficient could be reduced for larger transport aircraft. However, in order to do this the centre of mass range which the aircraft is require to tolerate must be reduced.

It is an aim of the present invention to address or mitigate this problem to provide a more responsive and versatile aircraft for use under variable loading conditions.

SUMMARY

According to a first aspect of the present disclosure there is provided a modular energy storage system within a vehicle, wherein the energy storage system comprises a plurality of discrete energy storage units which are movable within the vehicle, for example during the loading process, and selectively securable in a variety of positions.

Various aircraft propulsion concepts benefiting from energy storage, either alone or in combination with conventional propulsion systems ("hybrid") are known.

In general, these concepts are designed so that the location of the energy storage module(s) is fixed (for example, wing-mounted energy storage has proposed in some concepts), and the empty centre of mass of the aircraft is also substantially fixed. This means that the aircraft still requires a substantially conventional loadability envelope when compared with the state of the art, and therefore requires a correspondingly conventional high tail volume coefficient.

By providing a modular system whereby the mass distribution of energy storage units can be adjusted, for example along the length of an aircraft, changes in the CG due to loading of the aircraft can be compensated. The overall CG of the aircraft can therefore be tuned to remain within a relatively small envelope for a variety of loading conditions, allowing smaller tail volume coefficients to be used.

The modular energy storage system may comprise a plurality of connection points within the vehicle for receiving and securing the energy storage modules.

The number of connection points may exceed the number of energy storage modules. For example, the number of connection points may exceed the maximum number of energy storage modules able to be carried, or may simply exceed the number of modules required for a particular journey.

Where the vehicle is an aircraft, the plurality of connection points may be distributed within the fuselage of the aircraft, for example along the roll axis of the aircraft (i.e. the axis running in parallel to the direction of flight of the aircraft).

Additionally, or alternatively, a plurality of connection points may be distributed within the wings or lifting surfaces of the aircraft.

The system may provide more attachment/connection points than the maximum number of energy storage modules which can be carried in flight, eg due to MTOW (Maximum Take-Off Weight) constraints.

Each of the plurality of connection points may be connected to all systems of the vehicle requiring power from the modular energy storage system, for example the engines, electrical system, etc.

The plurality of energy storage modules may comprise batteries.

The discrete energy storage units may be securable in a variety of longitudinal, lateral or vertical positions.

Wherever practicable, any of the essential or preferable features described above with reference to any particular aspect of the present disclosure may be applied to any further aspect. Accordingly, the present disclosure may comprise various alternative configurations of the features defined above.

DESCRIPTION OF THE DRAWINGS

Practicable embodiments of the present disclosure are described in further detail below by way of example only with reference to the accompanying drawings, of which.

DETAILED DESCRIPTION

Figure 1:
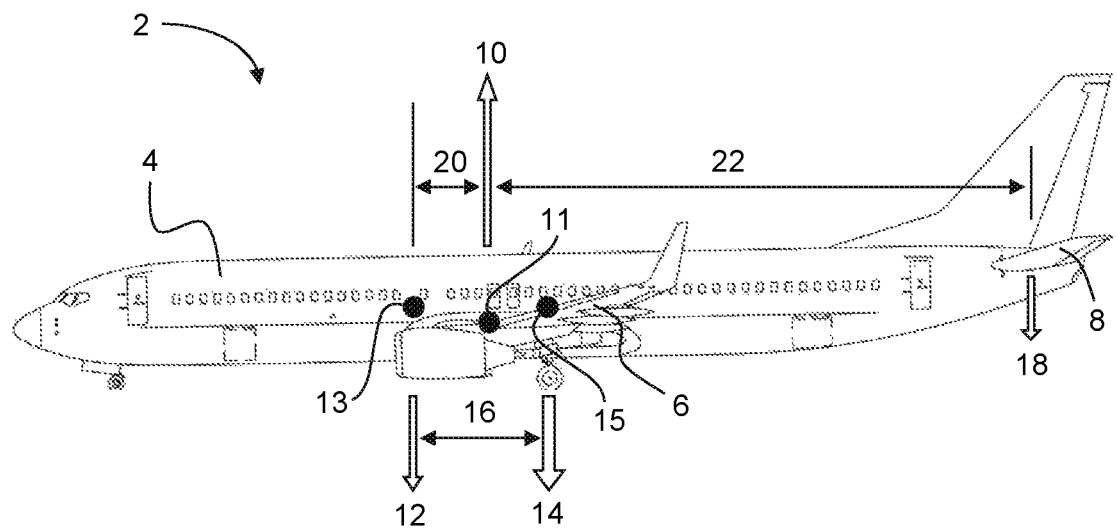
FIG. 1 shows a side view of an example aircraft and the vertical forces acting thereon.

FIG. 1 shows a side view of a loaded passenger aircraft 2. The aircraft briefly comprises a fuselage 4, a wing 6 and a horizontal stabiliser or tail 8. Lift 10 is generated predominantly by the wing 6, and can be considered to act at a longitudinal position 11 towards the leading edge of the wing 6. The position of this centre of lift 11 can be assumed to be fixed.

The lift 10 is required to overcome the aircraft weight 12 and payload weight 14 which are indicated separately in FIG. 1. The centre of gravity (CG), for the unloaded aircraft will be fixed, so the aircraft CG 13, through which the aircraft weight 12 acts, will not move.

The longitudinal distance between the centre of lift 11 and the aircraft CG 13 is known as the static margin. In the illustrated example, the aircraft CG 13 is ahead of the centre of lift 11, so the aircraft 2 is said to have a positive static margin.

The CG for the payload may vary depending on how the aircraft is loaded, but its longitudinal position is effectively fixed for a relatively uniformly loaded aircraft. As such, the payload weight 14 can also be assumed to act at a fixed longitudinal location referred to as the payload CG 15.

The tail 8 of the aircraft is shown providing a small amount of negative lift 18 at the rear of the fuselage 4. To maintain balanced level flight, the effect of the negative lift 18 at the rear of the aircraft 2 needs to balance the combined effect of the aircraft weight 12 and payload weight 14 towards the front of the aircraft.

It should be clear that the overall CG for the loaded aircraft 2 in FIG. 1 will fall somewhere in the region 16 between the aircraft CG 13 and the payload CG 15, depending on the relative masses of the empty aircraft and the cargo/payload. The overall CG of an empty aircraft will be the aircraft CG 13, and the overall CG of a fully loaded aircraft, ie at the maximum total weight that can be overcome by the lift 10, will approach the payload CG 15. However, in order for the negative lift 18 from the tail 8 to balance the weight, the overall CG of the loaded aircraft 2 cannot lie behind the centre of lift 11. As a result, the aircraft loading capacity is effectively limited to payload weights 14 for which the overall CG falls within a smaller region 20 between the aircraft CG 13 and the centre of lift 11. This could lead to a situation where the aircraft 2 would be unable to carry a full payload because of the effect this has on the overall CG of the aircraft.

One approach to overcoming this problem is to provide an aircraft CG 13 that sits further forward of the wings 6, and thus increase the distance 16 from the aircraft CG 13 to the payload CG 15. However, a larger tail volume coefficient ($V_h$) would be required to accommodate this greater range, compromising the handling and efficiency of the aircraft 2. It should be understood that the aircraft 2 of FIG. 1 would already likely have a relatively high $V_h$ to allow a variety of CG locations to be accommodated and provide a useful 'loadability envelope'. This can result in an aircraft that is sluggish/unresponsive even when not loaded.

Figure 2:
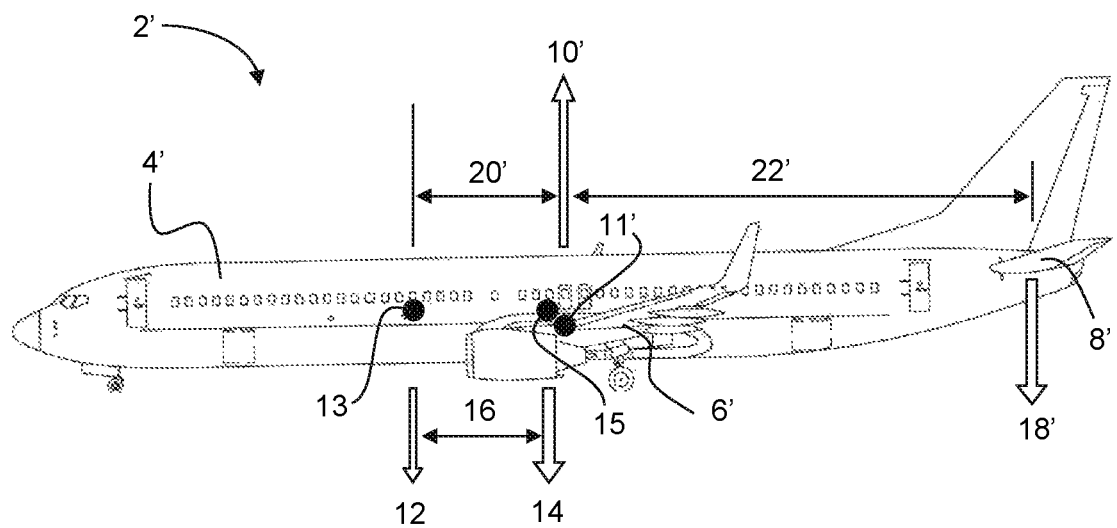
FIG. 2 shows a side view similar to FIG. 1 of an alternative example aircraft.

An alternative approach is illustrated in FIG. 2. The alternative aircraft 2' of FIG. 2 is similar to the aircraft 2 of FIG. 1, with the exception that the wings 6' are located slightly further toward the rear of the fuselage 4'. The aircraft weight 12 and payload weight 14 are unchanged, and the region 16 between their associated CGs 13, 15 is also assumed to be substantially the same.

The key change is that the centre of lift 11' has moved back along the aircraft 2' with the wings 6', so that lift 10' is now generated further towards the rear of the aircraft. With the aircraft CG substantially unchanged, the region 20' within which the overall aircraft CG must lie is increased compared to the aircraft 2 of FIG. 1. Indeed, since the centre of lift 11' is now at a point behind the payload CG 15, behind which the overall CG of the loaded aircraft 2' cannot lie, the full theoretical loading capacity, based on the lift 10' generated by the wings 6', is no longer compromised.

The main drawback of the configuration of FIG. 2 is that the negative lift 18' that needs to be generated by the tail 8' is greater. The tail 8' is now effectively closer to the centre of lift 11', so that the horizontal tail moment arm ($l_h$) 22' is shorter than the horizontal tail moment arm 22 of the FIG. 1 configuration. Since the wing area (S) and the average wing chord (c) are unchanged, the horizontal area ($S_h$) of the tail 8' must increase in order to maintain a constant tail volume coefficient ($V_h$). The larger tail 8' creates additional drag, reducing the efficiency of the aircraft 2'.

Furthermore, the longest possible moment arm from the centre of lift 11' to the overall CG of the aircraft 2', which corresponds to the overall length of region 20', is also longer than in the configuration of FIG. 1. Accordingly, the tail 18' needs to be able to generate an even larger downward force 18' to counteract the weight of the aircraft 2', resulting in a likely increase in the required $V_h$, and the associated handling compromises discussed above. In extreme cases, larger amounts of negative lift 18' generated by the tail 8' could reduce the overall load carrying capacity or require an increase in the lift 10' generated by the aircraft, which would further increase drag and reduce efficiency.

Most commercial aircraft are designed with a positive static margin, as described above, but other configurations, including designs with a small negative static margin giving relaxed static stability, are possible. However, even these alternative designs are still subject to penalty if their centre of gravity is not correctly located.

In general terms, for a constant attitude to be maintained during flight, all moments about the centre of gravity must sum to zero. Because the production of vertical forces (lift) inevitably lead to the production of drag, it is desirable to limit the total lift produced to the minimum value, which is set by the weight of the aircraft. The optimum solution would be to ensure that the centre of lift 11, 11' is coincident with the centre of gravity of the aircraft under all loading conditions, but this is seldom possible with known designs.

The problems outlined above arise primarily because of the way the CG of an aircraft 2, 2' varies between its loaded and unloaded states, and the need for the aircraft to perform in both unloaded and loaded states. The present disclosure addresses this problem by allowing the location of the aircraft CG 13 to be adjusted as required.

Figure 3:
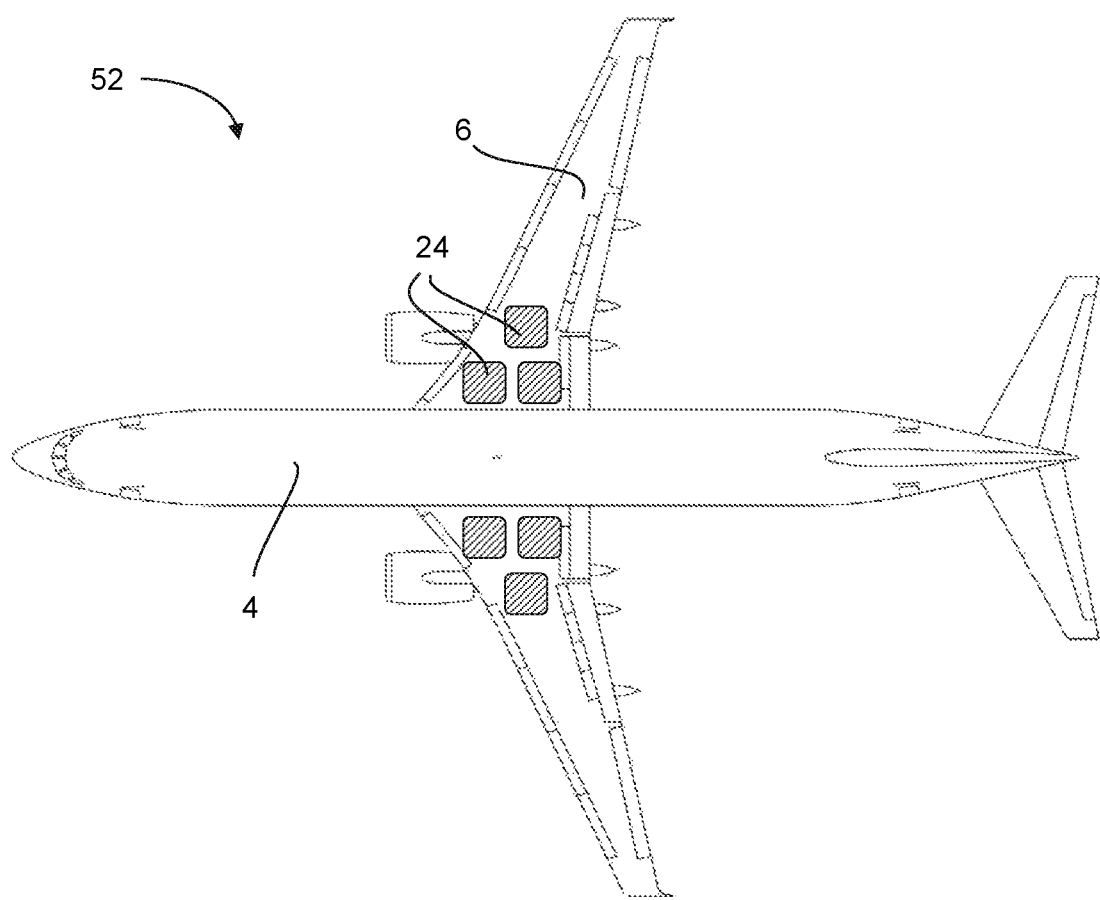
FIG. 3 shows a plan view of a known aircraft configuration.

As mentioned above, various aircraft propulsion concepts benefiting from energy storage are known, and one known configuration of such an aircraft is illustrated schematically in FIG. 3.

FIG. 3 is a plan view of an aircraft 52 which is similar in design to the aircraft 2 of FIG. 1. A total of six energy storage units 24, in the form of banks of batteries, are illustrated within the wings 6 of the aircraft, although it should be understood that a greater or lesser number could be provided in practice. A plurality of connections located throughout wings and the fuselage 4 of the aircraft connect the energy storage units 24 to the aircraft engines and systems as required.

The positions of the energy storage units 24 in the aircraft 52 are fixed, so the empty centre of mass, or aircraft CG 13, is also substantially fixed. The aircraft 52 still therefore provides a substantially conventional loadability envelope, and therefore requires a correspondingly conventional high tail volume coefficient.

Figure 4:
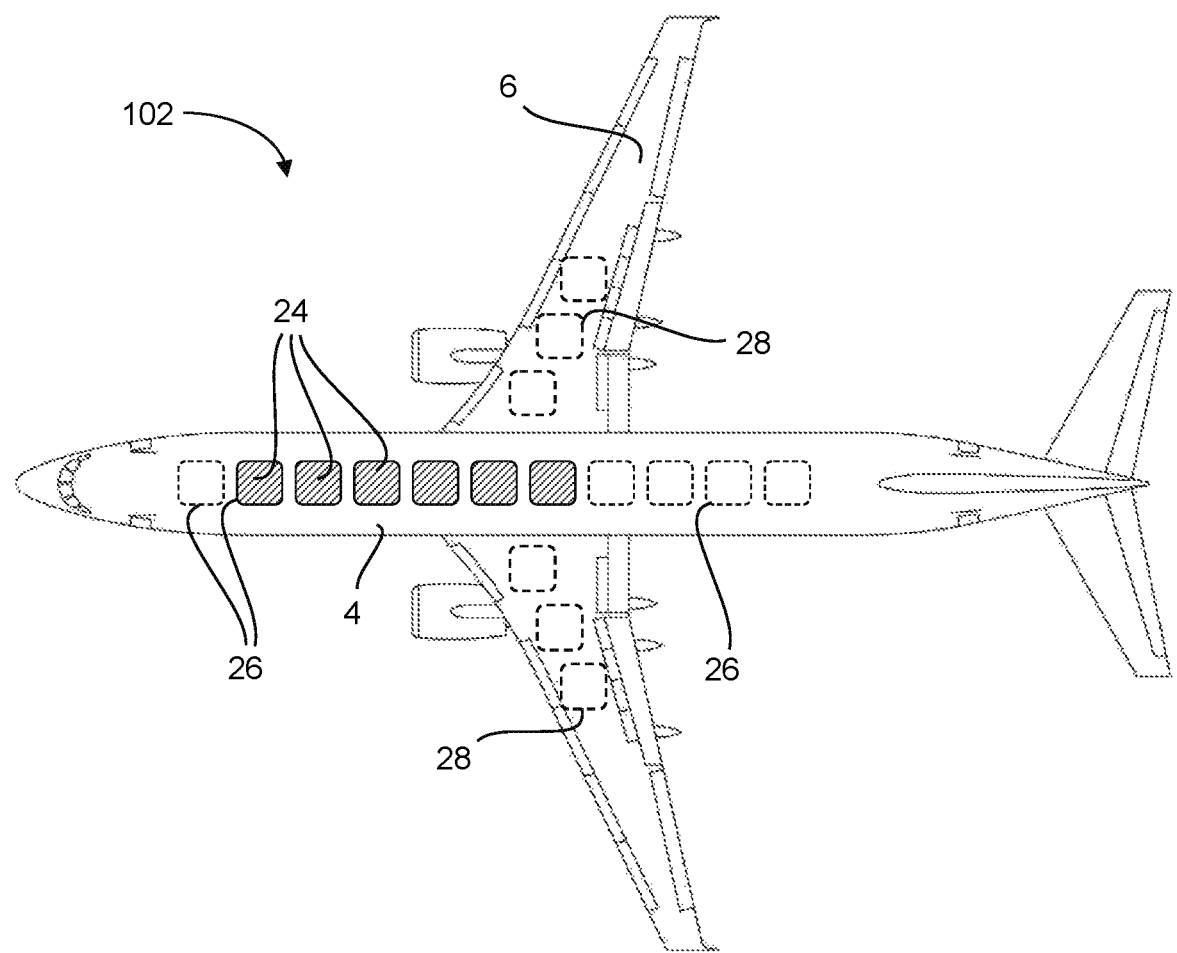
FIG. 4 shows a plan view of an aircraft configuration according to the present disclosure.

The present disclosure is schematically illustrated in the plan view of FIG. 4. The further alternative aircraft 102 of FIG. 4 again shows six energy storage units 24. However, unlike in FIG. 3, the energy storage units are located within the fuselage 4 rather than in the wings 6. Each of the energy storage units 24 is docked at a connection point 26 from which connections run to the engines and aircraft systems as necessary. The number of connection points 26 provided exceeds the number of energy storage units 24 so that a number of spare connection points 26 (in this case five) are provided along the length of the fuselage. Since each connection point 26 has the necessary connections to the aircraft systems, an energy storage unit 24 can be docked at any of the connection points along the length of the fuselage.

The individual energy storage units 24 are relatively small in size so can be accommodated easily within the fuselage 4, but are relatively heavy. As such, adjusting the lengthwise distribution of the energy storage units 24 will have a significant impact on the position of the aircraft CG 13. In particular, electric aircraft will tend to have large battery mass fractions, so moving individual batteries is an attractive solution to adjusting the mass distribution.

This is more effective than attempting to achieved a similar result by movement of the payload, because payload fraction can be fairly small, and therefore have limited influence on the overall centre of gravity of the loaded aircraft. Payload location may also be constrained. For example, some aircraft are operated in a so-called 'combi' configuration, with both cargo and passengers. The cargo may be of very different density from the passengers, and segregated therefrom. Load factors in passenger and cargo compartments may be different. In addition, first class passengers are typically seated at the front of the aircraft in a segregated zone, and are allocated more space and are therefore of a lower density than economy class passengers. As such, load factors may vary between seating classes, & the difference in ticket prices makes it economically unacceptable to optimize the distribution of passengers within the cabin to manage CG.

Modular batteries are also beneficial because they can be decoupled from the aircraft for recharging to reduce turn-around time. This may also permit improved management of charging processes, and permits easy management of battery life. In the event that batteries are life limited parts with shorter life than the rest of the aircraft, this modular approach is clearly beneficial.

The possibility of changing the total battery mass from mission to mission is also beneficial. For example, fewer units 24 could be included for short range missions, where less energy storage capacity is required, would allow an aircraft to carry more payload at a given MTOW.

The arrangement of FIG. 4 allows the energy storage units 24 to be selectively located in order to optimize the aircraft CG 13 in response to particular requirements. For example, the units 24 could be arranged towards the rear of the aircraft, using primarily the rearmost connection points 26, when the aircraft is unloaded and moved forward only when required to compensate the weight of a payload 14. As a result, the amount of variation 16 in the location of the overall CG between unloaded and fully loaded configurations would be reduced. This in turn allows the aircraft to be designed with a smaller static margin. Aircraft with small or slightly negative static margins tend to be able to tolerate a smaller $V_h$ and therefore, for a given horizontal tail moment arm ($I_h$) 22, 22', a smaller horizontal tail area $S_h$, which is beneficial for the reasons described above. In addition, reducing the static margin tends to improve manoeuvrability any given level of tail volume coefficient $V_h$.

Alternatively, the loadability envelope of an aircraft would be increased for a given $V_h$.

There may also be benefits to vertical tail volume coefficient requirement, thus allowing the use of a smaller vertical tail. This not only reduces drag and weight, but takes weight out of the back of the aircraft, where it is almost always most harmful.

Another benefit of being able to adjust longitudinal centre of mass of the unloaded aircraft is that more freedom is provided when loading cargo or payload. For example, a balanced weighting along the fuselage 4, as would typically be required, may not represent the most efficient use of space or the most efficient loading or unloading order. With the ability to tune the aircraft CG 13, there is more possibility to ensure that the full capacity of the aircraft is utilised and/or to ensure that cargo is loaded, unloaded or grouped in the most desirable manner with minimum impact on the overall centre of gravity of the loaded aircraft.

A further advantage of the specific configuration illustrated in FIG. 4 is that the energy storage units 24 are aligned with the roll axis of the aircraft 102. However, it should be understood that there may also, in some circumstances, be some benefit in allowing some lateral adjustment of the energy storage units. This could be achieved by providing connection points 26 at different lateral positions within the fuselage, or by providing additional or alternative connection points 28 within the wings of an aircraft.

In a blended wing body (BWB) aircraft, it is beneficial to arrange the lateral distribution of variable weights (payload, fuel, etc.) so as to achieve maximum bending moment relief in order to produce the minimum level of stress on the structure. By providing for lateral distribution of the energy storage units 24, the present disclosure would be of benefit in obtaining this optimum distribution.

It will also be advantageous to make the loading symmetrical so that large control deflections are not required to maintain trim in roll. Similar benefits apply to conventional aircraft. Indeed, locating energy storage units 24 in the wings of such aircraft can help to reduce the wing root bending moment, because local weight cancels local lift.

Although developed in relation to hybrid systems and energy storage modules in aircraft, the present disclosure might also be applied to other components and/or other vehicles benefitting from energy storage and having trim requirements (e.g. ships or hovercraft).

The invention claimed is:

1. A modular energy storage system within a vehicle, wherein the energy storage system comprises a plurality of discrete energy storage units which are movable within the vehicle and selectively securable in a variety of positions,
    wherein the modular energy storage system includes a plurality of connection points within the vehicle for receiving and securing the plurality of discrete energy storage units,
    wherein a number of the plurality of connection points exceeds a number of the plurality of discrete energy storage units, and
    wherein the vehicle is an aircraft and at least a first subset of the plurality of connection points are distributed within the fuselage of the aircraft.

2. A modular energy storage system according to claim 1, wherein the plurality of connection points are distributed along the roll axis of the aircraft.

3. A modular energy storage system according to claim 1, wherein each of the plurality of connection points is connected to all systems of the vehicle requiring power from the modular energy storage system.

4. A modular energy storage system according to claim 1, wherein the plurality of energy storage units comprises batteries.

5. A modular energy storage system according to claim 1, wherein the discrete energy storage units are securable in a variety of longitudinal positions.

6. A modular energy storage system according to claim 1, wherein the discrete energy storage units are securable in a variety of lateral positions.

7. A modular energy storage system according to claim 1, wherein the discrete energy storage units are securable in a variety of vertical positions.

8. A modular energy storage system within a vehicle, wherein the energy storage system comprises a plurality of discrete energy storage units which are movable within the vehicle and selectively securable in a variety of positions,
    wherein the modular energy storage system includes a plurality of connection points within the vehicle for receiving and securing the energy storage units,
    wherein the vehicle is an aircraft and the plurality of connection points are distributed within the fuselage of the aircraft, and
    wherein the vehicle is an aircraft and the plurality of connection points are distributed within the lifting surfaces of the aircraft.

9. A modular energy storage system according to claim 8, wherein a number of the plurality of connection points exceeds a number of the plurality of energy storage units.

10. A modular energy storage system according to claim 8, wherein the discrete energy storage units are securable in a variety of vertical positions.

11. A modular energy storage system according to claim 10, wherein the plurality of connection points are distributed along the roll axis of the aircraft.

12. A modular energy storage system according to claim 11, wherein the plurality of discrete energy storage units are securable in a variety of lateral positions.

13. A modular energy storage system comprising
    an aircraft having a fuselage and wings coupled with the fuselage,
    a plurality of discrete energy storage units which are movable within the aircraft and selectively securable in a variety of positions, the discrete energy storage units comprising batteries, and
    a plurality of connection points fixed within the aircraft for receiving and securing the plurality of discrete energy storage units to the aircraft, the plurality of connection points being distributed along a roll axis of the aircraft within the fuselage and along the wings of the aircraft, and a number of the plurality of connection points exceeds a number of the plurality of discrete energy storage units,
    wherein the plurality of discrete energy storage units are secured to the plurality of connection points to fix a position of the plurality of discrete energy storage units relative to the aircraft during flight of the aircraft.

14. A modular energy storage system according to claim 13, wherein the plurality of discrete energy storage units are secured to the plurality of connection points to cause a centre of gravity of the aircraft when unloaded to be forward of a centre of lift of the aircraft.

15. A modular energy storage system according to claim 14, wherein the plurality of connection points are located forward of the wings, aligned with the wings, and aft of the wings.

16. A modular energy storage system according to claim 13, wherein the plurality of discrete energy storage units are securable in a variety of vertical positions.

17. A modular energy storage system according to claim 14, wherein the plurality of discrete energy storage units are securable in a variety of longitudinal positions.

18. A modular energy storage system according to claim 15, wherein the plurality of discrete energy storage units are securable in a variety of lateral positions.

* * * * *